United States Patent
Shin et al.

(10) Patent No.: US 8,724,557 B2
(45) Date of Patent: May 13, 2014

(54) SENSOR NETWORK MEDIUM ACCESS CONTROL (MAC) SYSTEM FOR MULTIHOP COMMUNICATION

(75) Inventors: Chang Sub Shin, Daejeon (KR); Seong Soon Joo, Daejeon (KR); Jong Suk Chae, Daejeon (KR); Wun Cheol Jeong, Daejeon (KR); Jae Hong Ruy, Daejeon (KR); Myung Jong Lee, New York, NY (US); Tae Rim Park, New York, NY (US)

(73) Assignee: Electronics and Telecommunications Research Institute, Daejeon (KR)

( * ) Notice: Subject to any disclaimer, the term of this patent is extended or adjusted under 35 U.S.C. 154(b) by 866 days.

(21) Appl. No.: 12/501,024

(22) Filed: Jul. 10, 2009

(65) Prior Publication Data

US 2010/0034159 A1 Feb. 11, 2010

(30) Foreign Application Priority Data

| Jul. 11, 2008 | (KR) | 10-2008-0067811 |
| Nov. 11, 2008 | (KR) | 10-2008-0111857 |
| Mar. 11, 2009 | (KR) | 10-2009-0020729 |
| Jul. 9, 2009 | (KR) | 10-2009-0062563 |

(51) Int. Cl.
*H04W 4/00* (2009.01)
*H04W 72/04* (2009.01)

(52) U.S. Cl.
CPC .................. *H04W 72/04* (2013.01)
USPC .......................................................... 370/329

(58) Field of Classification Search
CPC ....................................................... H04W 72/04
USPC .......................................................... 370/329
See application file for complete search history.

(56) References Cited

U.S. PATENT DOCUMENTS

| 7,313,153 | B2 * | 12/2007 | Sugaya ........................ 370/468 |
| 7,489,651 | B2 * | 2/2009 | Sugaya et al. ................ 370/322 |
| 2003/0169697 | A1 * | 9/2003 | Suzuki et al. ................ 370/310 |
| 2008/0031199 | A1 * | 2/2008 | Park et al. .................... 370/336 |
| 2009/0238160 | A1 * | 9/2009 | Bhatti et al. ................. 370/338 |
| 2011/0038343 | A1 * | 2/2011 | Bhatti et al. ................. 370/330 |
| 2011/0310879 | A1 * | 12/2011 | Wu et al. ...................... 370/345 |

OTHER PUBLICATIONS

Jamieson, TG4-Proposal-for-D17-GTS-changes, Nov. 2002, IEEE, pp. 1-13.*
"Wireless Medium Access Control (MAC) and Physical Layer (PHY) Specifications for High Rate Wireless Personal Area Networks (WPANs)", LAN/MAN Standards Committee, Sep. 29, 2003, pp. 1-324.

* cited by examiner

*Primary Examiner* — Mark Rinehart
*Assistant Examiner* — Christopher R Crompton
(74) *Attorney, Agent, or Firm* — Staas & Halsey LLP

(57) ABSTRACT

A medium access control (MAC) technique of a multihop sensor network. In the multihop sensor network, the MAC technique may contribute to significantly reducing transmission delay, and allow real-time services to be provided to all nodes by extending a guaranteed time slot (GTS) restricted to one hop in a personal area network (PAN) coordinator (PNC) to all nodes. Furthermore, the MAC technique may allow the number of available GTSs to be significantly increased, by using all 16 frequency band channels instead of using only a single frequency band and setting a multi-superframe.

23 Claims, 16 Drawing Sheets

US 8,724,557 B2

SENSOR NETWORK MEDIUM ACCESS CONTROL (MAC) SYSTEM FOR MULTIHOP COMMUNICATION

CROSS-REFERENCE TO RELATED PATENT APPLICATION

This application claims the benefit of Korean Patent Application No. 10-2008-0067811, filed on Jul. 11, 2008, Korean Patent Application No. 10-2008-0111857, filed on Nov. 11, 2008, Korean Patent Application No. 10-2009-0020729, filed on Mar. 11, 2009, and Korean Patent Application No. 10-2009-0062563, filed on Jul. 9, 2009, in the Korean Intellectual Property Office, the disclosures of which are incorporated herein in its entirety by reference.

BACKGROUND OF THE INVENTION

1. Field of the Invention

The present invention relates to a medium access control (MAC) technique of a multi-hop sensor network, which is performed in real time and has high reliability.

2. Description of the Related Art

Data transmissions in a sensor network are classified into two methods according to service types, namely, into data transmission through competition and data transmission through independent time distribution. In particular, in a multi-hop sensor network, time allocation for communication is an important issue.

SUMMARY OF THE INVENTION

The present invention tries to prevent transmission delay caused by a relatively long inactive duration in order to achieve energy consumption and convenient scheduling. The present invention also tries to allocate independent time and channels for real-time services to nodes incapable of directly communicating with a personal area network (PAN) coordinator (PNC) (nodes existing 2 hops or more from the PNC). Furthermore, the present invention tries to determine the possibility of occurrence of adjacent-channel interference in advance and prevent the occurrence of the adjacent channel interference in order to achieve the allocation of the independent time and channels.

According to an aspect of the present invention, there is provided a slot scheduling method performed in a medium access control (MAC) system of a multihop sensor network, the slot scheduling method including transmitting a request command that requests slot allocation, from a source node to a destination node that exists within transmission range; receiving a reply command that indicates the slot allocation, from the destination node; and transmitting to the destination node a notification command that confirms that a slot has been allocated. The slot may be an extended slot defined with a channel number and a slot number within a non-competition period of a multi-superframe formed of at least one superframe.

According to another aspect of the present invention, there is provided a slot scheduling method performed in an MAC system of a multihop sensor network, the slot scheduling method including receiving a request command that requests slot allocation, from a source node, wherein the receiving is performed by a destination node; transmitting a reply command that includes an allocated slot, to the source node; and receiving from the source node a notification command that confirms the slot allocation. The slot may be an extended slot defined with a channel number and a slot number within a non-competition period of a multi-superframe formed of at least one superframe.

According to another aspect of the present invention, there is provided a method of scheduling the slots in a non-competition period of a superframe between neighboring nodes in a MAC system of a multihop sensor network, the slot scheduling method including defining a multi-superframe by including at least one superframe, wherein the defining is performed by a coordinator of the multihop sensor network; and constructing a non-competition period of the multi-superframe with an extended slot defined with a channel number and a slot number.

According to another aspect of the present invention, there is provided a method of scheduling the slots in a non-competition period of a superframe between neighboring nodes in a MAC system of a multihop sensor network, the slot scheduling method including transmitting a request command for the slot scheduling, from a first node to a second node; receiving a reply command from the second node; and transmitting to the second node a notification command that confirms the reply command. The slot may be an extended slot defined with a channel number and a slot number within a non-competition period of a multi-superframe formed of at least one superframe.

According to another aspect of the present invention, there is provided a MAC communication system for performing multihop communication between a plurality of nodes in a sensor network by using a superframe, in which a beacon interval of the sensor network comprises an active duration while communication is performed through the superframe and an inactive duration while no communication is performed, and the inactive duration is constructed with a plurality of superframes so that the entire beacon interval is activated to perform communication.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
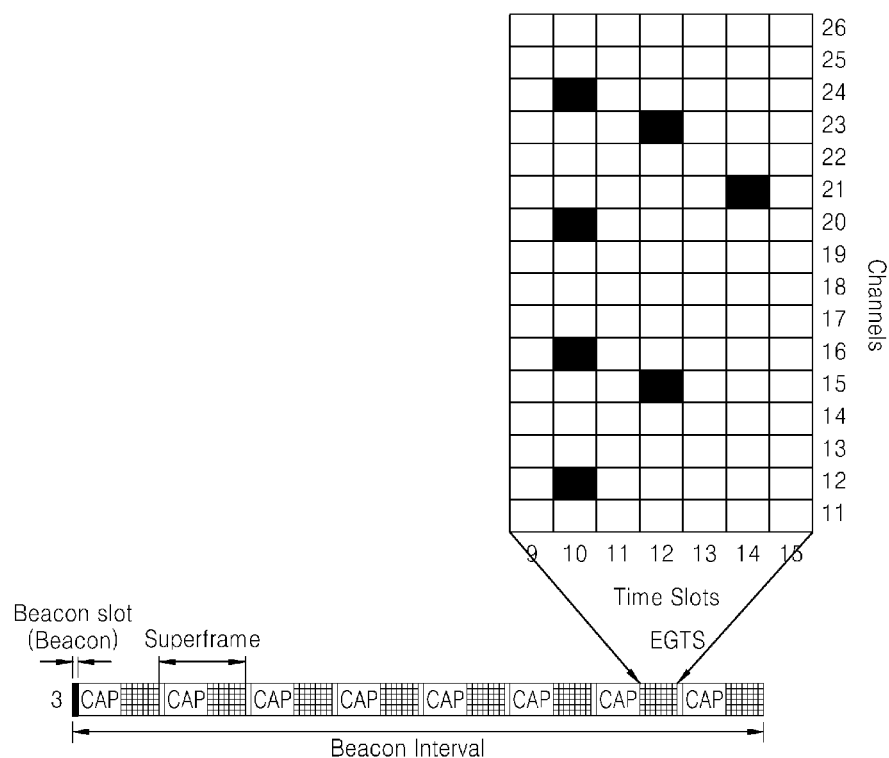
FIG. 1 illustrates a structure of a multi-channel superframe that is constructed in a medium access control (MAC) system of a multi-hop sensor network, according to an embodiment of the present invention.

Preferred embodiments of the present invention will now be described with reference to the accompanying drawings. Like reference numerals or characters in the drawings denote like elements. The following description and drawings are not to be construed as limiting the invention and numerous specific details are described to provide a thorough understanding of the present invention, as the basis for the claims and as a basis for teaching one of ordinary skill in the art how to make and/or use the invention. However in certain instances, well-known or conventional details are not described in order not to unnecessarily obscure the present invention.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The present invention provides a framework capable of allocating an active time to each node, a method of allocating independent time within the active time, a method of preventing adjacent-channel interference from occurring, and a method of increasing the stability of a common channel.

IEEE802.15.4 medium access control (MAC) may be the most representative technique of a sensor network MAC technique for ensuring real-time and reliable services. According to the IEEE 802.15.4, a network is formed to have a tree structure that starts from a personal area network (PAN) coordinator (PNC), an independent active duration is allocated to each node according to a scheduling method supported by a user, and each node communicates in its corresponding active duration. An active duration (superframe) starts when a node transmits a beacon. When a node transmits a beacon, the active duration (superframe) is referred to as an Outgoing superframe duration (OSD). When a parent node of the node above in a tree structure transmits a beacon, the active duration (superframe) is referred to as an Incoming superframe duration (ISD), and the OSDs of adjacent nodes should not overlap each other in terms of time in order to prevent collision of the beacons of the adjacent nodes. Nodes capable of communicating directly with the PNC (one-hop nodes) support data communication by allocating an independent time called as a guaranteed time slot (GTS). To this end, the one-hope nodes, which are capable of communicating directly with a PNC, request an independent time through a GTS request frame, and the PNC transmits information indicating allocation or non-allocation of time through a beacon.

Terms used in the present invention are defined as follows.

The PNC means a controller of a sensor network and corresponds to the summit of a tree structure.

The OSD means an active time duration that starts when a node transmits a beacon.

The ISD means an active time duration that starts when a parent node on the tree structure transmits a beacon.

An Extended GTS (EGTS) is a GTS extended to a multi-hop, a multichannel, or a multi-superframe.

FIG. 1 illustrates a structure of a multi-channel superframe that is constructed in an MAC system of a multi-hop sensor network, according to an embodiment of the present invention.

Referring to FIG. 1, in contrast with a conventional system using only a single frequency band channel, 16 channels are used simultaneously to address slot deficiency caused by permission of only at most 7 GTSs of a Contention Free Period (CFP) in a conventional single superframe, so that the number of slots is increased. The increase in the number of slots denotes an extension of a GTS. A GTS extended by the present invention is referred to as an EGTS, and a single EGTS is defined by a slot number and a channel number.

Figure 2:
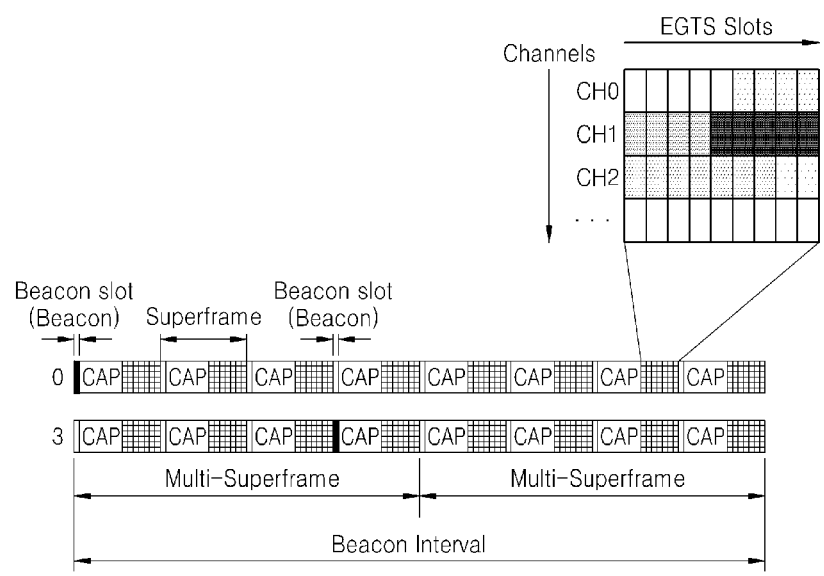
FIG. 2 illustrates a structure of a multi-superframe that is constructed in the MAC system of the multi-hop sensor network, according to an embodiment of the present invention.

FIG. 2 illustrates a structure of a multi-superframe that is constructed in a MAC system of a multi-hop sensor network, according to an embodiment of the present invention.

In the multi-channel superframe of FIG. 1, no more than 7 slots are allowed for a GTS in a single superframe, and a single node is not allowed to transceive data via several channels simultaneously. Accordingly, the number of slots that a single node can use in a single superframe is still restricted, and thus the number of neighboring nodes to which the single node can be connected is restricted. To overcome this restriction, a multi-superframe is formed by grouping a plurality of superframes, namely, N superframes. The size and structure of the multi-superframe depend on the values of Beacon Order (BO), Superframe Order (SO), and Multi-superframe Order (MO). The BO denotes an interval at which a coordinator transmits a beacon frame, and the BO and a Beacon Interval (BI) are related as follows: [BI=aBaseSuperframeDurarion*$2^{BO}$ symbols ($0 \leq BO \leq 14$)]. If the value of the BO is 15, the coordinator does not transmit a beacon frame except when requested to do so, such as, upon receipt of a beacon request command. If the value of the BO is 15, the value of the SO is ignored. The SO denotes the length of a superframe and includes a beacon frame, a Contention Access Period (CAP), and a CFP. The SO and a Superframe Duration (SD) are related as follows: [SD=aBaseSuperframeDurarion*$2^{SO}$ symbols ($0 \leq SO \leq BO \leq 14$)]. The MO denotes the length of a multi-superframe, which is a cycle of a repeated EGTS allocation schedule. A relationship between the MO and a multi-superframe Duration (MD) and values for determining the multi-superframe's structure will now be described as follows:

The number of superframes that constitute a multi-superframe: $N=2^{(MO-SO)}$

The length of the multi-superframe: MD= aBaseSuperframeDurarion*$2^{MO}$ symbols The number of EGTSs included in the multi-superframe: $S=16*(7*2^{(MO-SO)})$ A pattern of allocated slots repeats for each multi-superframe. The allocated slot pattern may determine the BO, the SO, and the MO according to circumstances, such as the frequency of data transmission, an allowed transmission-delay duration, and an allowed amount of power consumption, and use them. During a period remaining after excluding a period of time allocated to a node from an EGTS duration of a multi-superframe, the node may be maintained in an inactive state to reduce energy consumption. FIG. 2 illustrates a superframe structure having BO=6, SO=3, and MO=5. In this case, the BI is eight times as long as the SD and twice as long as the MD.

Each superframe is divided into a plurality of superframe slots equally spaced apart from one another at intervals of a length of $2^{SO}*aBaseSlotDuration$, and is made up of three parts: a beacon frame, a CAP and a CFP. The beacon frame is transmitted, without the use of a Carrier Sense Multiple Access (CSMA) protocol, at the start of slot 0, and is immediately followed by the CAP. The start of slot 0 is defined as the point at which a first symbol of a beacon PHY Protocol Data Unit (PPDU) is transmitted. The CFP follows immediately after the CAP and extends to the end of an active portion of the superframe. Allocated EGTSs are located within the CFP.

Figure 3:
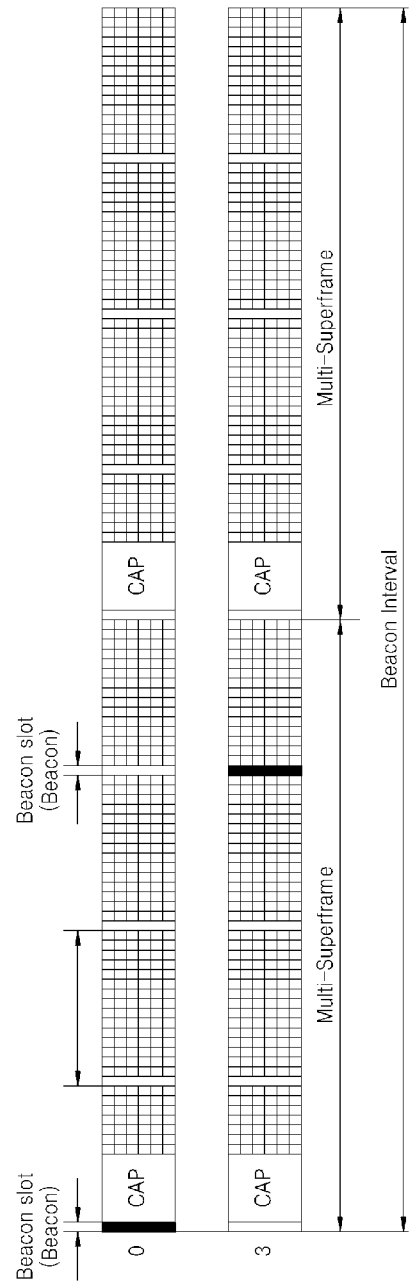
FIG. 3 illustrates a structure of a Contention Access Period (CAP)-reduced multi-superframe that is constructed in the MAC system of the multi-hop sensor network, according to an embodiment of the present invention.

FIG. 3 illustrates a structure of a CAP-reduced multi-superframe that is constructed in the MAC system of the multi-hop sensor network, according to an embodiment of the present invention.

work in order to achieve scheduling of the slots included in a non-competition period of a superframe between neighboring nodes. Coordinators (nodes) receive a beacon from the PAN and broadcast their beacons including the same information as the information received from the PAN, thereby allowing all nodes in the network to share the same information about the multi-superframe.

The PAN defines a multi-superframe including at least two consecutive superframes, using a beacon. Each superframe sequentially includes a beacon period in which a node transmits a beacon through a common channel, a competition period in which nodes competitively transmit data through the common channel, and a non-competition period in which data is transmitted at allocated slots. Each slot in the non-competition period is an EGTS defined with a channel number and a slot number, and each node transmits data via a channel corresponding to the channel number of the EGTS at a slot corresponding to the slot number of the EGTS. Each EGTS may include at least one subslot. The PAN may define a multi-superframe so that superframes next to a first superframe have non-competition periods immediately after their beacon periods instead of having competition periods. In a common channel which is common to the beacon period and the competition period, a frequency band may be hopped according to a determined pattern.

Table 1a is a format of an EGTS-based beacon frame, according to an embodiment of the present invention.

TABLE 1a

| Octets: 2 | 1 | 4/10 | 0/5/6/10/14 | 2 | variable | variable | variable | 4 | 4 | variable | variable | 2 |
|---|---|---|---|---|---|---|---|---|---|---|---|---|
| Frame Control | Sequence Number | Addressing Fields | Auxiliary Security Header | Superframe Specification | GTS | Pending address fields | Channel Diversity Specification | EGTS Superframe Specification | Time synchronization specification | Beacon Bitmap | Beacon Payload | FCS |
| | | MHR | | | | | | MAC Payload | | | | MFR |

To reduce transmission delay, the number of CAPs for each multi-superframe may be reduced to 1. A CAP is located after a first beacon slot of each multi-superframe. In the case of a beacon frame transmitted at a second beacon slot or each subsequent beacon slot of a multi-superframe, a CAP does not follow immediately after the beacon frame. Thus, the beacon frame specifies the time when a CAP starts. The number of slots included in a CAP-reduced multi-superframe is $16*(7+2^{(MO-SO)}-1)*15)$.

Tables 1a through 1e illustrate a format of an EGTS-based beacon frame, according to an embodiment of the present invention. Fields of the EGTS-based beacon frame format, which are the same as fields included in a beacon payload based on the existing IEEE 802.15.4 MAC standard, will not be described herein.

In the MAC system of the multi-hop sensor network, a PAN periodically broadcasts a beacon, which includes a multi-superframe structure and EGTS information, through a net- Table 1b illustrates a Channel Diversity Specification field of the beacon frame of Table 1a.

TABLE 1b

| Bits: 0 | 1-7 | 8-15 | 16-23 | variable |
|---|---|---|---|---|
| Channel Diversity Mode | Reserved | Channel Offset | Channel Offset Bitmap Length | Channel Offset Bitmap |

Table 1c illustrates an EGTS Superframe Specification field of the beacon frame of Table 1a.

TABLE 1c

| Bits: 0-3 | 4 | 5 | 6 | 7 | 8-23 | 24-31 |
|---|---|---|---|---|---|---|
| Multi-superframe Order(MO) | EGTS Flag | CAP Reduction Flag | Embedded CAP/CFP Flag | Reserved | CAP Index | Number of Sub-slots |

Figure 4:
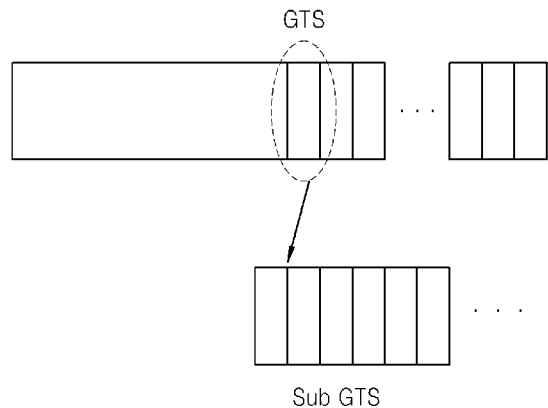
FIG. 4 illustrates an embedded Contention Free Period (CFP) method in which a guaranteed time slot (GTS) is divided into a plurality of sub-slots so as to be used, according to an embodiment of the present invention.

A Multi-superframe Order subfield specifies the length of a multi-superframe. If the value of an EGTS Flag subfield is FALSE, the CFP of a superframe is operated in the same way as defined in the existing IEEE 802.15.4 standard. If the value of the EGTS Flag subfield is TRUE, an EGTS according to the present invention is applied to the CFP of a superframe. If the value of a CAP Reduction Flag subfield is TRUE, a CAP Index subfield indicates the number of superframes existing before the next CAP begins. If the value of an Embedded CAP/CFP Flag subfield is '0', an Embedded CAP is used. If the value of the Embedded CAP/CFP Flag subfield is '1', an Embedded CFP is used, and a Number of Sub-slots subfield indicates the number of sub-slots into which a slot is divided. FIG. 4 illustrates an embedded CFP method in which a GTS based on the IEEE 802.15.4 MAC standard is divided into a plurality of sub-slots so as to be used, according to an embodiment of the present invention. In order to obtain efficiency of sub-slots by using the Embedded CFP method, the length of an MAC header may be reduced to a minimum length (for example, 1 byte). A first subslot of a single GTS may be used by the owner of the GTS, and the other subslots may be used by nodes. A contention-free method, for example, a time division multiple access (TDMA) method, is used for subslots as well as for a GTS. The use of subslots increases latency, scalability, and utilization.

Table 1d illustrates a Beacon Bitmap field of the beacon frame of Table 1a.

TABLE 1d

| Octets: 2 | Variable |
|---|---|
| SD Index | SD Bitmap |

An SD Index subfield indicates an SD bank number that is allocated to a source device of a beacon. An SD Bitmap subfield is $2^{(BO-SO)}$ bits in length and indicates the beacon frame allocation information of a neighboring node of a node that transmits the beacon. The SD Bitmap subfield may be expressed by a bitmap method in which a beacon schedule is represented as an order. The bit of a corresponding SD may be set to 1 if a beacon is allocated to the corresponding SD.

Table 1e illustrates a Time Synchronization Specification field of the beacon frame of Table 1a.

TABLE 1e

| Bits: 0 | 1-4 | 5-7 | 8-31 |
|---|---|---|---|
| Deferred Beacon Flag | Deffered Beacon Time | Reserved | Beacon Timestamp |

A Deferred beacon flag subfield specifies whether clear channel assessment (CCA) is required before transmitting a beacon frame. If the Deferred beacon flag subfield is set to one, a device uses CCA before transmitting the beacon frame. If the Deferred beacon flag subfield is set to zero, the device does not use CCA before transmitting the beacon frame. A Deferred Beacon Time subfield specifies the number of back-off periods for CCA. If the Deferred Beacon Flag subfield is set to zero, the Deferred Beacon time subfield is ignored. A Beacon Timestamp subfield specifies the time of beacon transmission for time synchronization in symbol periods.

Table 2a illustrates a format of an EGTS handshake command that is an MAC command frame for allocating GTSs in a multi-hop environment, according to an embodiment of the present invention.

The EGTS handshake command is used for the allocation of a new EGTS, or the deallocation, reallocation, or a change of an existing EGTS.

TABLE 2a

| Octets: 7 | 1 | 1 |
|---|---|---|
| MHR fields | Command Frame Identifier | EGTS Characteristics |

Table 2b illustrates an EGTS Characteristics field of the EGTS handshake command of Table 2a.

TABLE 2b

| Bit: 0 | Bits: 1 | 2 | 3-10 | 11-13 | 14-15 | 16-31 | 32-47 | 48-51 | 52-67 | Variable |
|---|---|---|---|---|---|---|---|---|---|---|
| Channel DiversityMode | EGTS Flag | EGTS Direction | EGTS Length | EGTS Characteristics Type | EGTS Handshake Type | Destination Address | EGTS slot identifier | EGTS ABT sub-block length | EGTS ABT sub-block index | EGTS ABT sub-block |

Referring to Table 2b, a ChannelDiversityMode subfield is set as shown in Table 2c and may represent a Channel Adaptation mode or a Channel Hopping mode. If the ChannelDiversityMode subfield of the EGTS Characteristic field is set to '1', the EGTS allocation and/or deallocation is performed in the Channel Hopping mode. A main difference between the Channel Adaptation mode and the Channel Hopping mode is an EGTS Allocation Bitmap Table (ABT) subfield in the EGTSCharacteristic field. In the Channel Hopping mode, both a source device and a destination device exchange their Timeslot Allocation Bitmaps (TAB). In the Channel Adaptation mode, both the source device and the destination device exchange an ABT sub-block.

TABLE 2c

| Channel Diversity Mode value $b_0$ | Description |
|---|---|
| 0 | Channel Adaptation mode |
| 1 | Channel Hopping mode |

Referring to Table 2b, an EGTS Flag subfield represents whether an EGTS is used. The EGTS Flag subfield may be set to '1' to use the EGTS or set to '0' to use a GTS.

An EGTS Length subfield contains the number of superframe slots requested for the EGTS.

An EGTS Characteristics Type subfield may be set to one of the values listed in Table 2d, in order to represent deallocation, allocation, reallocation, duplicate allocation notification, suspension, reduction, restart, or reservation.

TABLE 2d

| EGTS Characteristics Type value $b_2 b_1 b_0$ | Description |
|---|---|
| 000 | Deallocation |
| 001 | Allocation |

TABLE 2d-continued

| EGTS Characteristics Type value $b_2b_1b_0$ | Description |
|---|---|
| 010 | Reallocation |
| 011 | Duplicate Allocation Notification |
| 100 | Suspension |
| 101 | Reduction |
| 110 | Restart |
| 111 | Reserved |

An EGTS Handshake Type subfield is set as shown in Table 2e in order to represent Request, Reply, Notify, and Reserved.

TABLE 2e

| EGTS Handshake Type value $b_1b_0$ | Description |
|---|---|
| 00 | Request |
| 01 | Reply |
| 10 | Notify |
| 11 | Reserved |

A prioritized channel access may be set to one if an EGTS is reserved as a high priority, or set to zero if the EGTS is reserved as a low priority. When an EGTS request command is used in an EGTS change procedure, the prioritized channel access may be set according to an original EGTS.

Referring back to Table 2b, a Destination Address subfield may contain a short address of the destination device.

An EGTS slot identifier subfield may contain a channel number, and beginning time slot numbers of slots that are to be allocated or deallocated.

An EGTS ABT sub-block length subfield may contain the length of an EGTS ABT sub-block.

An EGTS ABT sub-block index subfield may indicate the beginning of an EGTS ABT sub-block in the entire ABT.

An EGTS ABT sub-block subfield may contain the EGTS ABT sub-block of the ABT.

Figure 5A:
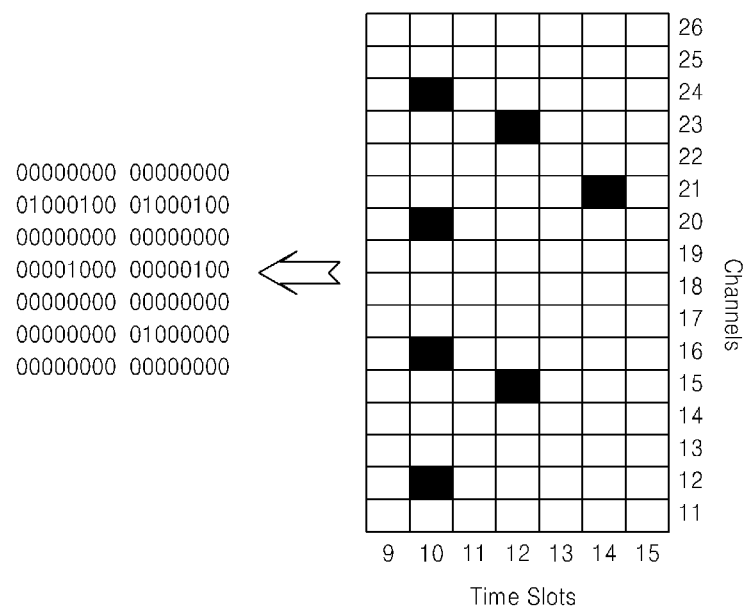
FIGS. 5A and 5B illustrate a method of representing and storing an allocated slot pattern of an extended GTS (EGTS), according to an embodiment of the present invention.
Figure 5B:
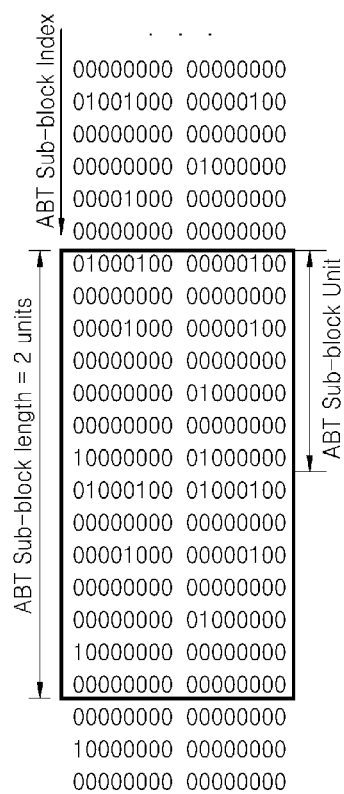

FIGS. 5A and 5B illustrate a method of representing and storing a pattern of allocated EGTSs, according to an embodiment of the present invention;

Each node manages an ABT. The pattern of the allocated slots is represented and stored as a Bitmap. Each row of the ABT represents a time slot, and each column thereof represents a channel. Vacant slots are expressed as 0, and slots used by a node or its neighboring nodes are expressed as 1. FIG. 5A illustrates a case where the values of the MO and the SO are 3 and the size of the ABT is 14 bytes. When the length of a multi-superframe which is determined by an MO is large, it is difficult for an EGTS command frame to transmit the entire ABT, and thus the EGTS command frame may transmit only some blocks instead of transmitting the entire ABT. FIG. 5B illustrates a case where only a 28-byte sub-block from the entire ABT having MO=7, SO=3, and a size of 224 octets (1792 slots) is transmitted. In FIG. 5B, an ABT sub-block unit has a size of 14 octets (7 time slots×16 channels). In a CAP reduction mode, the ABT sub-block unit may have a size of 30 octets (15 time slots×16 channels).

Figure 6:
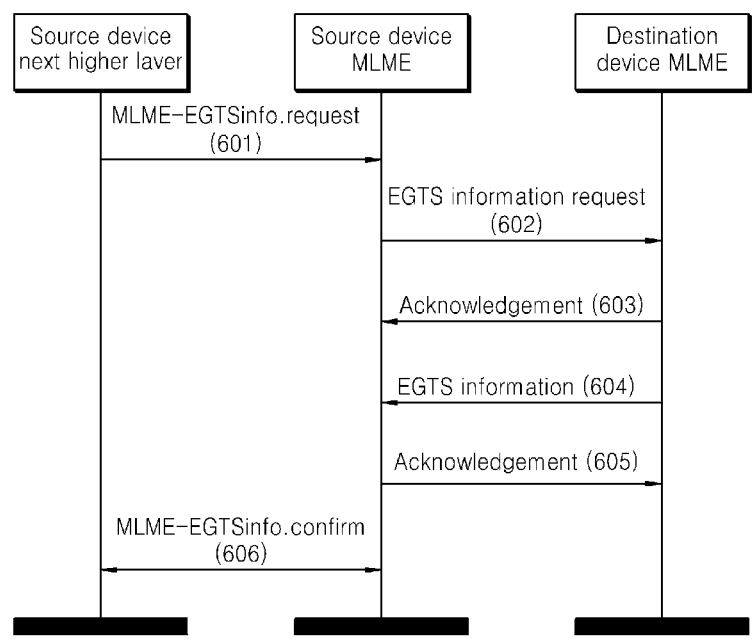
FIG. 6 is a flow diagram of an EGTS information request message in the MAC system of the multi-hop sensor network, according to an embodiment of the present invention.

FIG. 6 is a flow diagram of an EGTS information request message in the MAC system of the multi-hop sensor network, according to an embodiment of the present invention.

Table 3 illustrates a format of an EGTS information request command, according to an embodiment of the present invention. The EGTS information request command is used by a source device that requests a timestamp and EGTS parameters.

TABLE 3

| Octets: 7 | 1 |
|---|---|
| MHR Fields | Command Frame Identifier |

When synchronization loss has occurred in a CAP or a CFP of a current superframe before an EGTS of the current superframe starts, the source device may request the EGTS's parameters and the timestamp through an MLME-EGTSinfo.request primitive. In operation 601, the MLME-EGTSinfo.request primitive is transmitted from a next higher layer of the source device to an MAC layer management entity (MLME) of the source device. In operation 602, the MLME transmits the EGTS information request command to the destination device. Since the EGTS information request command includes an acknowledgement (ACK) request, the destination device acknowledges the receipt of the EGTS information request command by transmitting an ACK frame to the MLME of the source device, in operation 603. In operation 604, in response to the EGTS information request command, an MLME of the destination device may transmit the timestamp and the EGTS's parameters to the source device. In response to the ACK frame received from the destination device, the source device allows its receiver to receive a data frame that includes the timestamp and the EGTS's parameters from the destination device for a predetermined period of time. Upon receipt of the data frame, the source device transmits an ACK frame to the destination device, in operation 605. In operation 606, the MLME of the source device notifies its next higher layer of a success of an EGTS information request. The notification happens when the MLME of the source device generates an MLME-EGTSinfo.confirm primitive that represents the success. The source device is synchronized with the destination device by using the received timestamp and continuously uses its own EGTS during the current superframe. When the source device does not receive the data frame, which includes the timestamp and the EGTS's parameters, from the destination device for the predetermined period of time, the MLME of the source device notifies its next higher layer of a failure of the EGTS information request. The notification happens when the MLME of the source device generates an MLME-EGTSinfo.confirm primitive that represents the failure. The source device may conclude this EGTS information request procedure or may resume the EGTS information request procedure by using the MLME-EGTSinfo.request primitive.

Figure 7:
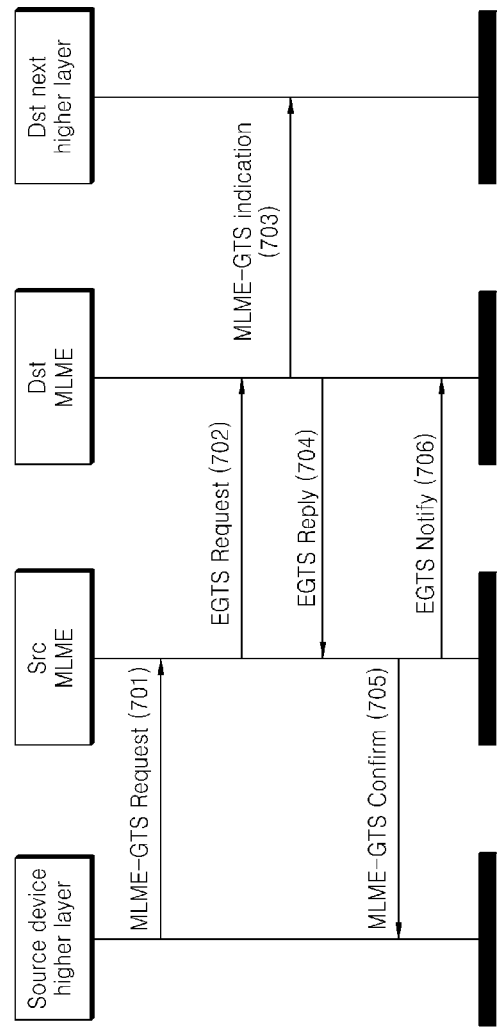
FIG. 7 is a message flow diagram illustrating when a source device initiates EGTS allocation, de-allocation, re-allocation, or a change in the MAC system of the multi-hop sensor network, according to an embodiment of the present invention.

FIG. 7 is a message flow diagram illustrating when the source device initiates EGTS allocation, de-allocation, re-allocation, or a change in the MAC system of the multi-hop sensor network, according to an embodiment of the present invention.

Referring to FIG. 7, in operation 701, a next higher layer of the source device transmits an MLME-GTS.request primitive to an MLME of the source device. In operation 702, the MLME of the source device transmits an EGTS request command to the destination device. The EGTS request command is in regard to EGTS allocation, de-allocation, re-allocation, or a change. In operation 703, in response to the EGTS request command, an MLME of the destination device transmits an MLME-GTS.indication primitive to a next higher layer of the destination device. In operation 704, the MLME of the destination device transmits an EGTS reply command to the MLME of the source device. In operation 705, in response to the EGTS reply command, the MLME of the source device transmits to the next higher layer of the source device an MLME-GTS.confirm primitive that represents a success of an EGTS request. In operation 706, the MLME of the source device transmits an EGTS notify command to the MLME of the destination device.

Figure 8:
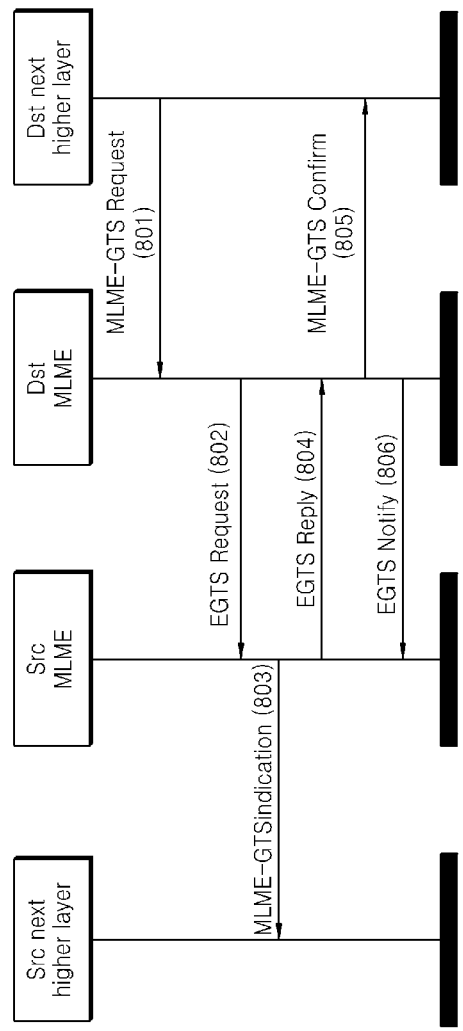
FIG. 8 is a message flow diagram illustrating when a destination device initiates EGTS de-allocation, EGTS re-allocation, or an EGTS change in the MAC system of the multi-hop sensor network, according to an embodiment of the present invention.

FIG. 8 is a message flow diagram illustrating when the destination device initiates EGTS de-allocation, EGTS re-allocation, or an EGTS change in the MAC system of the multi-hop sensor network, according to an embodiment of the present invention.

Referring to FIG. 8, in operation 801, a next higher layer of the destination device transmits an MLME-GTS.request primitive to an MLME of the destination device. In operation 802, the MLME of the destination device transmits an EGTS request command to the MLME of the source device. The EGTS request command is in regard to EGTS de-allocation, EGTS re-allocation, or an EGTS change. In operation 803, in response to the EGTS request command, the MLME of the source device transmits an MLME-GTS.indication primitive to a next higher layer of the source device. In operation 804, the MLME of the source device transmits an EGTS reply command to the MLME of the destination device. In operation 805, in response to the EGTS reply command, the MLME of the destination device transmits to the next higher layer of the destination device an MLME-GTS.confirm primitive that represents a success of an EGTS request. In operation 806, the MLME of the destination device transmits an EGTS notify command to the MLME of the source device.

Slot scheduling methods performed by the source device and the destination device in a multihop sensor network will now be described with reference to FIGS. 7 and 8.

EGTS Allocation

An EGTS may be allocated by the destination device, and may be used for communication between the source device and the destination device. A single EGTS may extend over one or more superframe slots. An EGTS may be allocated before use, and the destination device may decide whether to allocate an EGTS, based on an EGTS request and a current available capacity in a superframe. An EGTS may be allocated on a first-come-first-served basis, and all EGTSs may be placed adjacent to the end of a superframe and after a CAP (or after a beacon slot if CAP reduction is enabled). Each EGTS may be deallocated when the EGTS is no longer required, and an EGTS may be deallocated at any time by the destination device or the source device that originally requested the EGTS. A device that has been allocated an EGTS may also operate in the CAP. A data frame transmitted in an allocated EGTS may use short addressing. The management of EGTSs may be undertaken by the destination device and the source device. To facilitate EGTS management, the destination device and the source device may store all the information necessary to manage EGTSs. For each EGTS, the destination device and the source device may store its starting slot, length, and associated device address.

In response to a request for allocation of a new EGTS made through the MLME-GTS.request primitive, the source device sends an EGTS handshake command to the destination device. The EGTS Characteristics Type subfield of the EGTS Characteristics field of the EGTS handshake command may be set to "allocation" and the Handshake Type subfield may be set to "request". The EGTS length subfield may be set according to the characteristics of the required EGTS. The EGTS slot identifier subfield may be set to indicate a preferable beginning slot to be allocated. The EGTS ABT sub-block subfield may be set according to the allocation status of a device that is in a one-hop neighborhood of the source device.

The destination device receives the EGTS handshake command, which is for an EGTS allocation request, from the source device, and checks if there are available slots in the current multi-superframe, based on the ABT of the destination device and the ABT sub-block included in the EGTS handshake command for an EGTS allocation request. The current multi-superframe may have available slots if enough vacant slots exist in both ABTs (of the destination device and the source device) to satisfy a requested length. The destination device allocates an EGTS on a first-come-first-served basis. The destination device may allocate the EGTS with the beginning slot specified in the EGTS slot identifier subfield of an EGTS handshake command for an allocation reply. Then, the destination device broadcasts an EGTS handshake command to its one-hop neighbors. The destination address subfield of the EGTS Characteristics field in the EGTS handshake command may be set to the source device. The EGTS Characteristics Type subfield of the EGTS Characteristics field of the EGTS handshake command may be set to "allocation" and the Handshake Type subfield may be set to "reply". If the EGTS was allocated successfully, the EGTS length subfield may be set to the requested length and the ABT sub-block subfield may be set to represent the newly allocated slots. Otherwise, the EGTS length subfield may be set to zero.

Upon receipt of an EGTS handshake allocation reply command, a device processes an EGTS descriptor. If the address in the destination address subfield of the EGTS Characteristics field in the EGTS handshake allocation reply command does not match with the device's address, the device updates its ABT by reflecting the neighbor's newly allocated EGTS. If the newly allocated EGTS conflicts with the device's own EGTS, the device sends an EGTS handshake command to the origin of the EGTS handshake allocation reply command. The EGTS Characteristics Type subfield of the EGTS Characteristics field of the EGTS handshake command may be set to "duplicate allocation notification" and the EGTS Handshake Type subfield may be set to "request". If the address in the destination address subfield in the EGTS Characteristics field in the EGTS handshake allocation reply command matches the device's address, the MLME of the device (source device) then notifies the next higher layer of whether the GTS allocation request was successful. If the EGTS length matches with a requested length, the MLME issues an MLME-GTS.confirm primitive with a status of SUCCESS. If the EGTS length is not identical with the requested length, the MLME issues an MLME-GTS.confirm primitive with a status of DENIED. Then, the source device broadcasts an EGTS handshake command to the source device's one hop neighbors. The EGTS Characteristics Type subfield of the EGTS Characteristics field of the EGTS handshake command may be set to "allocation" and the EGTS Handshake Type subfield may be set to "notify".

Upon receipt of an EGTS handshake allocation notify command, a device processes the EGTS descriptor. The device updates its ABT by reflecting the neighbor's newly allocated EGTS. If the newly allocated EGTS conflicts with the device's own EGTS, the device sends an EGTS handshake command to the origin of the EGTS handshake allocation notify command. The EGTS Characteristics Type subfield of the EGTS Characteristics field of the EGTS handshake command may be set to "duplicate allocation notification" and the EGTS Handshake Type subfield may be set to "request". Upon receipt of an EGTS handshake duplicate allocation command, a device may perform an EGTS reallocation procedure.

Figure 9:
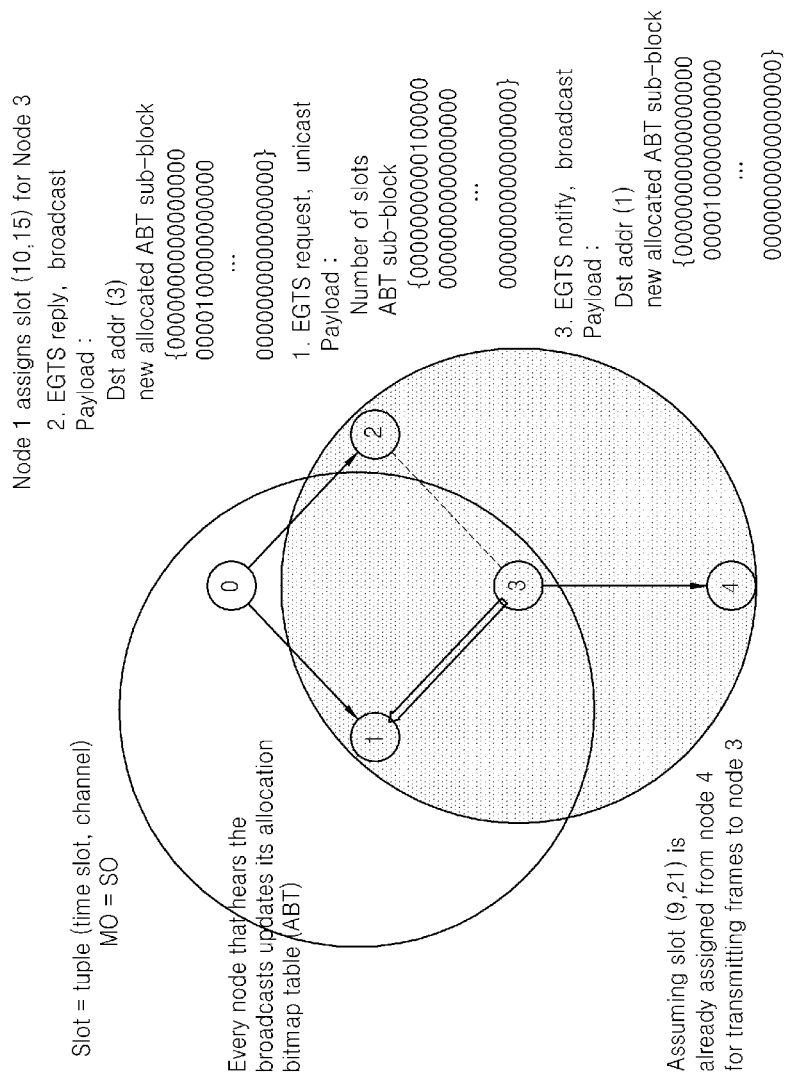
FIG. 9 illustrates EGTS allocation performed in the MAC system of the multi-hop sensor network, according to an embodiment of the present invention.

FIG. 9 illustrates EGTS allocation performed in the MAC system of the multi-hop sensor network, according to an embodiment of the present invention.

A node that requests GTS allocation, namely, node 3, sends an ABT sub-block that indicates an allocated slot (slot (9,21) in FIG. 9) together with the number of required slots, to a reception node (node 1) by using an EGTS request frame. The reception node collects the received information and its own information, selects an available slot (slot (10,15) in FIG. 9) from a determined sub-block, and notifies its neighboring nodes and the node 3, which has requested the GTS allocation, of a result of the selection through broadcasting. The node which has requested the GTS allocation (node 3) notifies its neighbors of the allocated slot by broadcasting the ABT sub-block. When a transmission error occurrence rate of the allocated slot exceeds a threshold value, the node 3 is allocated a slot that uses a channel different from a channel used by the allocated slot above. Nodes that have received the broadcasted ABT information update their own ABTs on the basis of the received ABT information.

Figure 10:
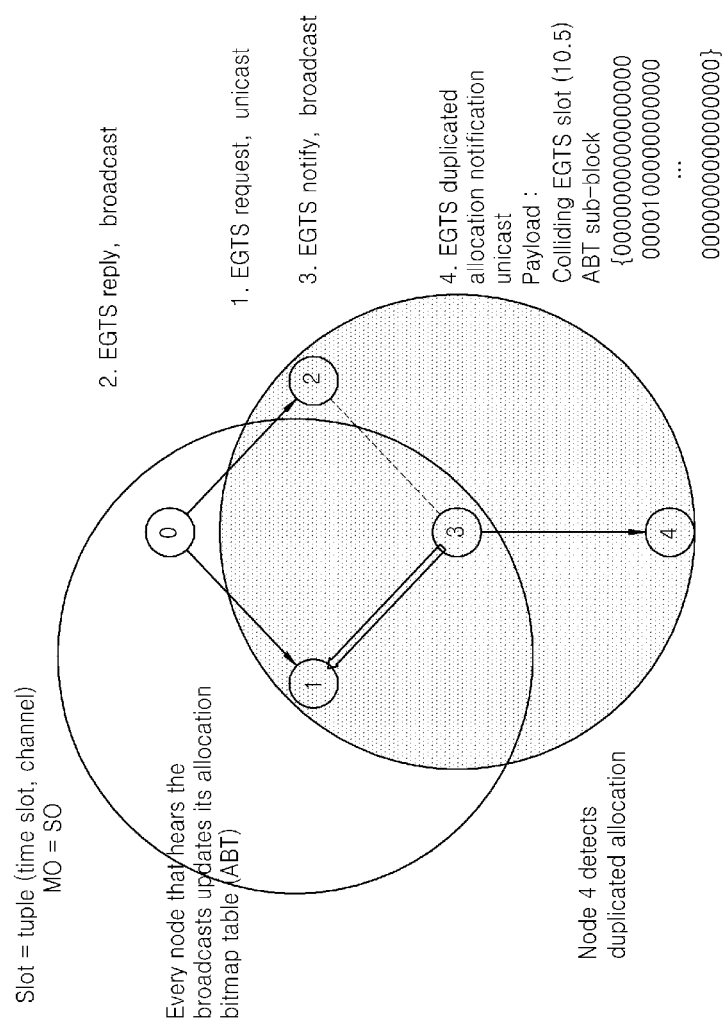
FIG. 10 illustrates a method of solving duplicate GTS allocation in the MAC system of the multi-hop sensor network, according to an embodiment of the present invention.

FIG. 10 illustrates a method of solving duplicate GTS allocation in the MAC system of the multi-hop sensor network, according to an embodiment of the present invention.

Duplication of GTS allocation such as a case where there exists a newly joined node or where an error has been generated during reception of an EGTS command frame, may occur. This duplication may be detected when receiving an EGTS reply or notify. When the duplication of GTS allocation is detected, an EGTS duplicate allocation notification frame is transmitted so that a corresponding node is allocated a new slot.

EGTS Deallocation

The source device is requested to perform deallocation of an existing EGTS through the MLME-GTS.request primitive, and sends an EGTS handshake deallocation command to the destination device. If the existing EGTS is expired, the destination device is requested through the MLME-GTS.request primitive to perform the deallocation of the existing EGTS, and sends an EGTS handshake deallocation command to the source device. The EGTS to be deallocated may not be used by the source device, and its existing characteristic values may be reset. To request the deallocation of the existing EGTS, the MLME of a device sends an EGTS handshake command in which the EGTS Characteristics Type subfield of the EGTS Characteristics field is set to "deallocation" and the EGTS Handshake Type subfield is set to "request". Upon receipt of an EGTS handshake deallocation command, the device (the source device or the destination device) attempts to deallocate an EGTS. If the EGTS characteristics contained in the EGTS handshake deallocation command do not match with the characteristics of the EGTS to be deallocated, the reception device ignores the request indicated by the EGTS handshake deallocation command. If the EGTS characteristics contained in the EGTS handshake deallocation command matches with the characteristics of the EGTS to be deallocated, the MLME of the reception device deallocates the EGTS and issues the MLME-GTS.indication primitive. The MLME-GTS.indication primitive contains the characteristics of the deallocated EGTS, and an EGTS characteristics type is set to "deallocation". Then, the reception device broadcasts an EGTS handshake command to its one-hop neighbors. The EGTS Characteristics Type subfield of the EGTS Characteristics field of the EGTS handshake command may be set to "deallocation", and the EGTS Handshake Type subfield may be set to "reply". The EGTS length subfield of the EGTS handshake command may be set according to the characteristics of the EGTS to be deallocated.

Upon receipt of an EGTS handshake deallocation reply command, the reception device processes the EGTS descriptor. If the address in the destination address subfield of the EGTS handshake deallocation reply command does not match with the reception device's address, the reception device updates its ABT by reflecting the neighbor's deallocated EGTS. If the address in the destination address subfield of the EGTS handshake deallocation reply command matches with the reception device's address, the MLME of the reception device then notifies its next higher layer of whether the GTS deallocation request was successful. If the EGTS length matches with the requested length, the MLME issues the MLME-GTS.confirm primitive with a status of SUCCESS. If the EGTS length is not identical with the requested length, the MLME issues the MLME-GTS.confirm primitive with a status of DENIED. Then, the reception device broadcasts an EGTS handshake command to the reception device's one hop neighbors. The EGTS Characteristics Type subfield of the EGTS Characteristics field of the EGTS handshake command is set to "deallocation" and the EGTS Handshake Type subfield is set to "Notify".

Upon receipt of an EGTS handshake deallocation notification command, the reception device processes the EGTS descriptor. The reception device updates its ABT by reflecting the neighbor's deallocated EGTS.

EGTS Reallocation

Upon receipt of a request to perform reallocation of an existing EGTS through the MLME-GTS.request primitive, the MLME of the source or destination device transmits an EGTS handshake command to the destination or source device. Also, a device may request the reallocation of an existing EGTS upon receipt of an EGTS handshake command with the Characteristics Type subfield of the EGTS Characteristics field set to "Duplicate Allocation Notification". The EGTS Characteristics Type subfield of the EGTS Characteristics field of the EGTS handshake command is set to "reallocation" and the EGTS Handshake Type subfield is set to "request". The EGTS length subfield may be set according to the desired characteristics of an EGTS requested to be reallocated. The EGTS slot identifier subfield may be set according to the characteristics of an EGTS to be reallocated. The direction subfield may be set if the device requesting EGTS reallocation is the source device or the destination device.

Upon receipt of an EGTS handshake reallocation request command, the reception device may attempt to reallocate an EGTS. If the EGTS characteristics contained in the EGTS handshake reallocation request command do not match with the characteristics of the EGTS to be reallocated, the reception device ignores the EGTS handshake reallocation request command. If the EGTS characteristics contained in the EGTS handshake reallocation request command matches with the characteristics of the EGTS to be reallocated, the reception device first checks if there is available capacity in the current multi-superframe, based on its ABT and the ABT sub-block included in the EGTS handshake reallocation request command. The current multi-superframe may have available capacity if enough vacant slots exist in both ABTs (of the destination device and the source device) to satisfy the requested length. EGTSs may be allocated on a first-come-first-served basis. If a new EGTS is successfully allocated, the existing EGTS may be removed from the reception device's ABT. Then, the reception device broadcasts an EGTS handshake command to its one-hop neighbors. The destination address subfield of the EGTS of the EGTS Characteristics field in the EGTS Handshake command may be set to the device that has requested EGTS reallocation. The EGTS Characteristics Type subfield of the EGTS Characteristics field of the EGTS handshake command may be set to "reallocation" and the EGTS Handshake Type subfield may be set to "reply". The EGTS slot identifier subfield may be set according to the characteristics of the EGTS to reallocate. If the EGTS was reallocated successfully, the length subfield may be set to the requested length and the ABT sub-block subfield may be set to represent a newly allocated slot. Otherwise, the length subfield may be set to '0'.

Upon receipt of an EGTS handshake reallocation reply command, the reception device processes the EGTS descriptor. If the address in the destination address subfield of the EGTS Characteristics field in the EGTS handshake allocation reply command does not match with the reception device's address, the reception device updates its ABT by reflecting the neighbor's reallocated EGTS. If the newly allocated EGTS conflicts with the reception device's own EGTS, the reception device sends an EGTS handshake command to the origin of the EGTS handshake reallocation reply command. The Characteristics Type subfield of the EGTS Characteristics field of the EGTS handshake command is set to "Duplicate Allocation Notification" and the Handshake Type subfield is set to "request". If the address in the destination address subfield in the EGTS Characteristics field in the EGTS handshake reallocation reply command matches with the reception device's address, the MLME of the reception device then notifies its next higher layer of whether the EGTS reallocation request was successful. This notification is achieved when the MLME issues the MLME-GTS.confirm primitive with a status of SUCCESS (if the EGTS length matches with the requested length) or DENIED (if the EGTS length did not match with the requested length). Then, the reception device broadcasts an EGTS handshake command to the reception device's one hop neighbors. The Characteristics Type subfield of the EGTS Characteristics field of the EGTS handshake command is set to "reallocation" and the Handshake Type subfield is set to "notify".

Upon receipt of an EGTS handshake reallocation notification command, the reception device processes the EGTS descriptor. The device updates its ABT by reflecting the neighbor's reallocated EGTS. If the newly allocated EGTS conflicts with the reception device's own EGTS, the reception device sends an EGTS handshake command to the origin of the EGTS handshake reallocation notification command. The Characteristics Type subfield of the EGTS Characteristics field of the EGTS handshake command is set to "Duplicate Allocation Notification" and the Handshake Type subfield is set to "request". Upon receipt of an EGTS handshake duplicate allocation notification command, the reception device reallocates the EGTS.

EGTS Change

The destination device allocates the EGTS to the source device according to the priority level indicated in an EGTS request command sent by the source device. If the destination device receives an EGTS request command of higher priority when all of its EGTSs have already been used, the destination device needs to either reduce or suspend some of the EGTSs which are being used for lower priority data transmission, in order to allocate a new EGTS for the higher priority data transmission. When the EGTS for the higher priority data transmission is finished, the destination device may restart the reduced or suspended EGTSs. An EGTS change procedure may be initiated when the destination device wants to reduce, suspend or restart EGTSs. The EGTS change (i.e., suspension, reduction, or restart) may be initiated by the destination device through the MLME-GTS.request primitive. When the EGTS change is initiated by the next higher layer of the destination device, the MLME receives the MLME-GTS.request primitive. The EGTS Characteristics type subfield of the EGTS Characteristics field of the MLME-GTS.request primitive is set to "suspension, reduction, or restart", and all other subfields are set according to the characteristics of the EGTS to which the destination device requests the source device to change its original EGTS.

The MLME of the destination device sends an EGTS request command to the source device. The EGTS Characteristics type subfield of the EGTS Characteristics field of the EGTS request command is set to "suspension, reduction, or restart", and all other subfields are set according to the characteristics of the EGTS to which the destination device requests the source device to change its original EGTS. Because the EGTS request command contains an ACK request, the source device confirms the receipt of the EGTS request command by sending an ACK frame. Upon receipt of an acknowledgment to the EGTS request command, the MLME of the destination device notifies the next higher layer of the destination device of the EGTS change. This notification is achieved when the MLME issues an MLME-GTS.confirm primitive that indicates a status of SUCCESS and that includes a EGTS Characteristics field in which the EGTS Characteristics type subfield is set to "suspension, reduction, or restart" and all other subfields are set according to the characteristics of the EGTS to which the destination device requests the source device to change its original EGTS. Upon receipt of an EGTS request command, the source device immediately changes its EGTS. The MLME of the source device notifies the next higher layer of the source device of the EGTS change. This notification is achieved when the MLME issues an MLME-GTS.indication primitive that includes an EGTS Characteristics field in which the EGTS Characteristics type subfield is set to "suspension, reduction, or restart" and all other subfields are set according to the characteristics of the EGTS to which the destination device requests the source device to change its original EGTS.

Figure 11:
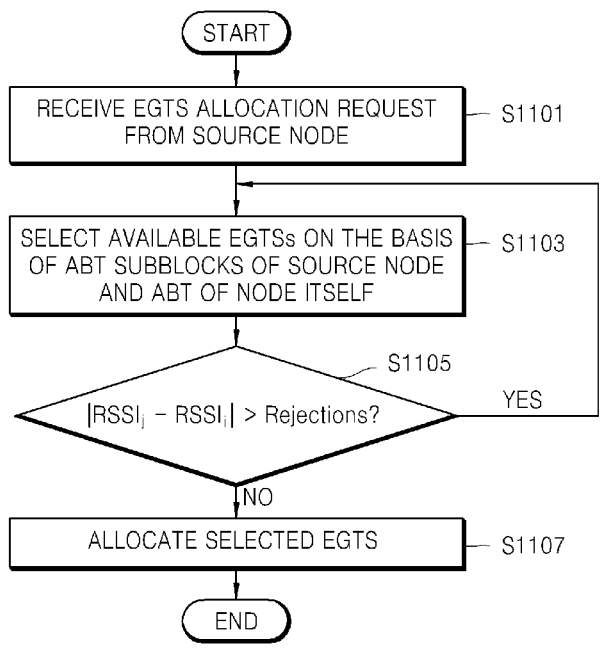
FIG. 11 is a flowchart of a method of preventing adjacent-channel interference from occurring during slot allocation, according to an embodiment of the present invention.

FIG. 11 is a flowchart of a method of preventing adjacent-channel interference from occurring during slot allocation, according to an embodiment of the present invention.

Referring to FIG. 11, in operation S1101, a reception node (node k) receives an EGTS allocation request. In operation S1103, the node k selects appropriate slots ($TS_i$, $CH_i$) on behalf of a request node (node i). The node k selects available EGTSs on the basis of ABT subblocks of the node i and the ABT of the node k. The node k measures the intensity $RSSI_j$ of a signal transmitted from each node neighboring the node k, the neighboring node existing in a transmission range. In operation S1105, the absolute value of a difference between an intensity $RSSI_i$ of the request node and the intensity $RSSI_j$ of each neighboring node is compared with a rejection characteristic value $Rejection_s$ of a transceiver. If the absolute value is greater than the rejection characteristic value $Rejection_s$, it is determined that interference is likely to occur in a selected slot, and the method goes back to operation S1101 in order to abandon the selected slot and select a new slot to re-attempt to determine occurrence or non-occurrence of the interference. On the other hand, if the absolute value is equal to or less than the rejection characteristic value $Rejection_s$, it is determined that interference is not likely to occur in the selected slot, and the selected slot is allocated to the node i, in operation S1107.

Figure 12:
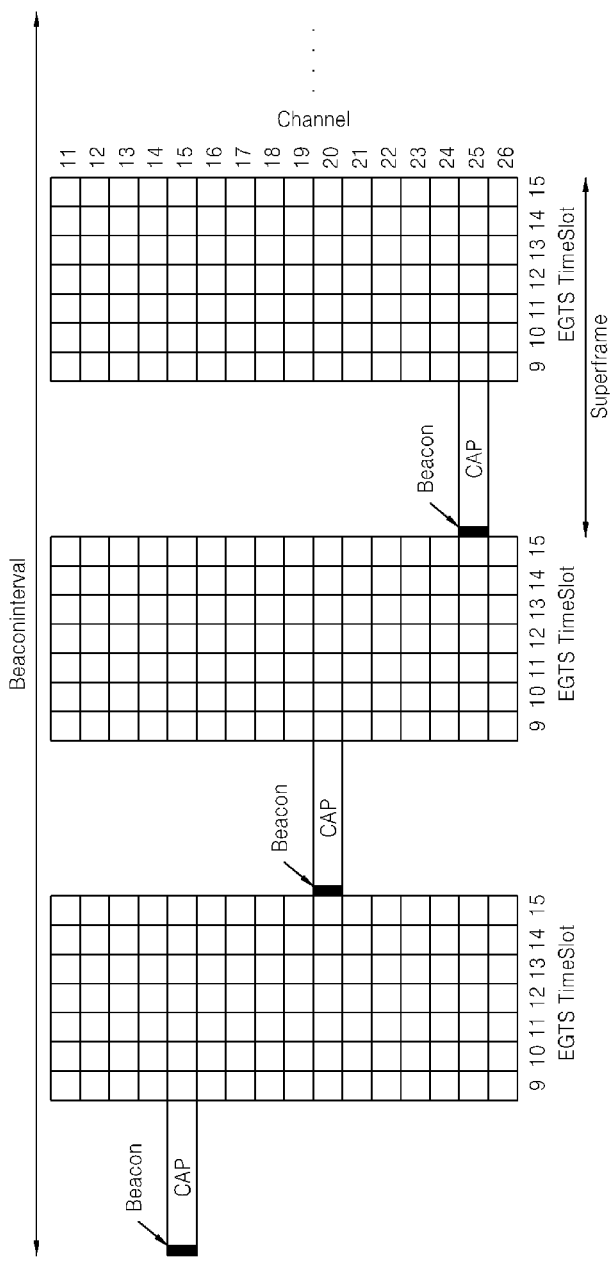
FIG. 12 illustrates frequency hopping of a common channel, according to an embodiment of the present invention.

FIG. 12 illustrates frequency hopping of a common channel, according to an embodiment of the present invention.

In consideration of the characteristics of dynamic wireless communication, the performance of which varies according to time and frequency, the frequency bands of a beacon and a CAP, which are common channels, are periodically changed according to a predetermined pattern and sequence in order to increase stability of the beacon and the CAP.

Examples of an MAC primitive for EGTS scheduling (allocation, deallocation, reallocation, or change) according to the present invention include MLME-GTS.request primitive, MLME-GTS.confirm primitive, and MLME-GTS.indication primitive.

The MLME-GTS.request primitive allows a device to requests a PNC or the destination device to allocate a new GTS (EGTS). The MLME-GTS.request primitive is also used to deallocate a GTS or EGTS. The MLME-GTS.request is described as follows:

```
MLME-GTS.request    (
                    GTSCharacteristics,
                    SecurityLevel,
                    KeyIdMode,
                    KeySource,
                    KeyIndex,
                    EGTSCharacteristics,
                    EGTSFlag
                    )
```

The MLME-GTS.request primitive is generated by the next higher layer of the source device and issued to its MLME to request the allocation of a new EGTS or to request the deallocation, reallocation, or change of an existing EGTS. The MLME-GTS.request primitive is also generated by the next higher layer of the destination device and issued to its MLME to request the deallocation, reallocation, or change of an existing EGTS.

Upon receipt of the MLME-GTS.request primitive, the MLME of a device generates a GTS request command or an EGTS request command according to an EGTSFlag parameter. If the EGTSFlag parameter is FALSE, the MLME-GTS.request primitive allows a process to be conducted according to the existing IEEE 802.15.4 standard. If the EGTSFlag parameter is TRUE, the source device requests the destination device to allocate or deallocate an EGTS, and the destination device initiates the EGTS deallocation. Upon receipt of the MLME-GTS.request primitive, the MLME of the source device generates an EGTS handshake command having the information contained in this primitive as a subtype. If the generation of the EGTS handshake command is successful, the MLME of the source device sends the EGTS handshake command to the destination device. If EGTSFlag is TRUE, upon receipt of the MLME-GTS.request primitive, the MLME of the destination device generates an EGTS handshake command having the information contained in this primitive as a subtype. If the generation of the EGTS handshake command is successful, the MLME of the destination device sends the EGTS handshake command to the source device. If a SecurityLevel parameter is set to a valid value indicating that security is required for a transmitted frame, the MLME may set a Security Enabled subfield of a Frame Control field to one. An MAC sublayer may perform outgoing processing on the transmitted frame on the basis of DstAddress, SecurityLevel, KeyIdMode, KeySource, and KeyIndex parameters. If any error occurs during the outgoing processing, the MLME discards the frame and issues an MLME-GTS.confirm primitive with a status of an error returned by the outgoing processing. If an EGTS handshake command cannot be sent according to a channel condition, the MLME issues an MLME-GTS.confirm primitive with a status of a channel access failure. If the MLME successfully transmits an EGTS handshake command, the MLME waits for an acknowledgment in return. If an acknowledgment is not received, the MLME issues an MLME-GTS.confirm primitive with a status of NO_ACK. If an acknowledgment is received, the MLME of the source device expects an EGTS allocation reply command from the destination device. If the MLME of the destination is able to allocate the requested EGTS, it may issue the MLME-GTS.indication primitive with the characteristics of the allocated EGTS and generate an EGTS allocation reply command. If the MLME of the destination device (or the PNC) is unable to allocate the requested EGTS, it generates an EGTS handshake allocation reply command with a EGTS length field set to '0'. If the EGTS handshake allocation reply command and an EGTS length match with the requested EGTS characteristics, that is, if the EGTS handshake allocation reply command indicates that the destination device has approved the EGTS allocation request, the MLME of the source device issues an MLME-GTS.confirm primitive with a status of SUCCESS and a characteristics type set to "EGTS allocation". If the EGTS handshake allocation reply command indicates that the destination device has denied the EGTS allocation request, that is, if a EGTS length is set to zero, the device that has requested the EGTS allocation issues an MLME-GTS.confirm primitive having a GTSCharacteristics parameter that represent a status of DENIED.

If a device requests EGTS deallocation and other devices acknowledge the request, the requesting device issues an MLME-GTS.confirm primitive with a status of SUCCESS and an EGTSCharacteristics parameter with a characteristics type indicating GTS deallocation. Upon receipt of an EGTS handshake deallocation request command, the reception device acknowledges the EGTS handshake deallocation request and deallocates the EGTS. The MLME of the reception device then issues an MLME-GTS.indication primitive with appropriate EGTS characteristics. If the destination device fails to receive the EGTS deallocation request, the PNC may apply counter measures to ensure that consistency is maintained.

If the destination device requests the source device to change an existing EGTS and the request has been acknowledged by the source device, the destination device issues an MLME-GTS.confirm primitive with a status of SUCCESS and an EGTSCharacteristics parameter with an EGTSCharacteristics type subfield set to "suspension, reduction, or restart" in order to indicate an EGTS change based on the MLME-GTS.request primitive. Upon receipt of an EGTS handshake change command, the source device acknowledges the frame and changes the EGTS. The MLME of the source device then issues an MLME-GTS.indication primitive with appropriate EGTS characteristics. If any parameter in the MLME-GTS.request primitive is not supported or is out of range, the MLME of the source device issues an MLME-GTS.confirm primitive indicating that the parameter is out of range, that is, invalid.

The MLME-GTS.confirm primitive reports the results of a request to allocate a new GTS or EGTS. The MLME-GTS.confirm primitive also reports the results of a request to deallocate an existing EGTS. If the value of the EGTSFlag is 'FALSE', the MLME-GTS.request primitive allows a process to be conducted according to the existing IEEE 802.15.4 standard. If the value of the EGTSFlag is 'TRUE', the MLME-GTS.confirm primitive reports the results of a request to allocate a new EGTS or to deallocate, reallocate, or change an existing EGTS. The MLME-GTS.confirm primitive is described as follows.

```
MLME-GTS.confirm    (
                    GTSCharacteristics,
                    status,
                    EGTSCharacteristics
                    )
```

If allocation, deallocation, reallocation, or change of an EGTS was successful, the MLME-GTS.confirm primitive transmits a status of SUCCESS and includes an EGTSCharacteristics parameter with a EGTSCharacteristics type subfield set to the allocation, deallocation, reallocation, or change. Otherwise, the status parameter may indicate an appropriate error code. If the value of the EGTS flag in the EGTSCharacterisitics parameter of the MLME-GTS.confirm primitive is set to '1', the next higher layer is notified of the result of its request to allocate, deallocate, reallocate, or change an EGTS. If the request was successful, the status parameter may indicate a successful EGTS operation. Otherwise, the status parameter may indicate an error.

The MLME-GTS.indication primitive is described as follows.

```
MLME-GTS.indication    (
                       DeviceAddress,
                       GTSCharacteristics,
                       SecurityLevel,
                       KeyIdMode,
                       KeySource,
                       KeyIndex,
                       EGTSCharactersitics
                       )
```

If the value of the EGTS flag is FALSE, the operation of this primitive is defined the same way as in the existing IEEE 802.15.4 standard. If the value of the EGTS flag is TRUE, the MLME-GTS.indication primitive indicates the allocation of a new EGTS or the deallocation, reallocation, or change of an existing EGTS. The MLME-GTS.indication primitive is generated by the MLME of the source device or the destination device and issued to its next higher layer when an EGTS is allocated, deallocated, reallocated, or changed after the reception of an EGTS handshake command by the MLME. Upon receipt of an MLME-GTS.indication primitive with the EGTS flag set to 'TRUE', the next higher layer is notified of the allocation, deallocation, reallocation, or change of an EGTS. Examples of MAC primitives for defining a method in which a device requests EGTS's information include MLME-EGTSinfo.request primitive and MLME-EGTSinfo.confirm primitive.

The MLME-EGTSinfo.request primitive allows the source device to request the destination node to provide a timestamp and EGTS's parameters. The MLME-EGTSinfo.request primitive is described as follows:

```
MLME-EGTSinfo.request    (
                         DstAddrMode,
                         DstAddress,
                         SecurityLevel,
                         KeyIdMode,
                         KeySource,
                         KeyIndex
                         )
```

The DstAddrMode parameter represents whether the address of the destination device is set to a short address or an extended address. The MLME-EGTSinfo.request primitive is generated by the next higher layer of the source device and issued to its MLME when the timestamp and the EGTS parameters are requested from the destination device. Upon receipt of the MLME-EGTSinfo.request primitive by a device, the MLME of the device generates and sends an EGTS information request command. The EGTS information request command includes destination address information.

If the SecurityLevel parameter is set to a valid value indicating that security is required for a transmitted frame, the MLME may set a Security Enabled subfield of a Frame Control field to one. The MAC sublayer may perform outgoing processing on the transmitted frame on the basis of the DstAddress, SecurityLevel, KeyIdMode, KeySource, and KeyIndex parameters. If any error occurs during the outgoing processing, the MLME discards the transmitted frame and issues an MLME-EGTSinfo.confirm primitive with a status of the error returned by the outgoing processing. If the EGTS information request command cannot be sent due to a CSMA-CA algorithm failure, the MLME issues the MLME-EGTSinfo.confirm primitive with a status of a channel access failure. If the MLME successfully transmits an EGTS information request command, the MLME expects an acknowledgment in return. If an acknowledgment is not received, the MLME issues the MLME-EGTSinfo.confirm primitive with a status of NO_ACK. If an acknowledgment is received, the MLME may request that a physical layer (PHY) enables its receiver. If a frame including EGTS information is received from the destination device, the MLME issues the MLME-EGTSinfo.confirm primitive with a status of SUCCESS. If the frame including EGTS information is not received within a predetermined standby time, the MLME issues the MLME-EGTSinfo.confirm primitive with a status of NO_DATA. If any parameter in the MLME-EGTSinfo.request primitive is not supported or is out of range, the MLME issues the MLME-EGTSinfo.confirm primitive indicating that the parameter is out of range, that is, invalid.

The MLME-EGTSinfo.confirm primitive reports the results of a request for the timestamp and the EGTS parameters, and is described as follows:

```
MLME-EGTSinfo.confirm primitive    (
                                   EGTSCharacteristics,
                                   Timestamp,
                                   status
                                   )
```

The MLME-GTSinfo.confirm primitive is generated by the MLME and issued to its next higher layer in response to the MLME-GTSinfo.request primitive. If the information request was successful, the status parameter may be represented as SUCCESS and the EGTS Characteristics Type field of the EGTSCharacteristics parameter may be set to Restart. Examples of the value of the status parameter include SUCCESS, CHANNEL_ACCESS_FAILURE, NO_ACK, NO_DATA, COUNTER_ERROR, FRAME_TOO_LONG, UNAVAILABLE_KEY, UNSUPPORTED_SECURITY/INVALID_PARAMETER, etc. Upon receipt of the MLME-GTSinfo.confirm primitive, the next higher layer is notified of the result of the procedure of requesting the timestamp and the EGTS parameters from the destination device.

Examples of MAC primitives for Quality of service (QoS) include MCPS-DATA.request primitive and MCPS-DATA.confirm primitive, and a TxOptions parameter is extended as follows:

(b0) 0: no Ack, 1: Ack
(b1) 0: CAP transmission, 1: GTS transmission
(b2) 0: direct transmission, 1: indirect transmission
(b3) 0: CAP/GTS transmission (15.4-2006),
  1: CAP/EGTS transmission (15.4e): e.g, version control
(b4) 0: Low Priority transmission, 1: High Priority transmission If the TxOptions parameter specifies that an EGTS transmission is required, the MAC sublayer sets an EGTS flag to one in order to indicate the EGTS transmission, and determines whether it has a valid EGTS. If a valid EGTS cannot be found, the MAC sublayer issues an MCPS-DATA.confirm primitive with a status of INVALID_GTS. If a valid EGTS was found, the MAC sublayer may defer until the valid EGTS.

Figure 13:
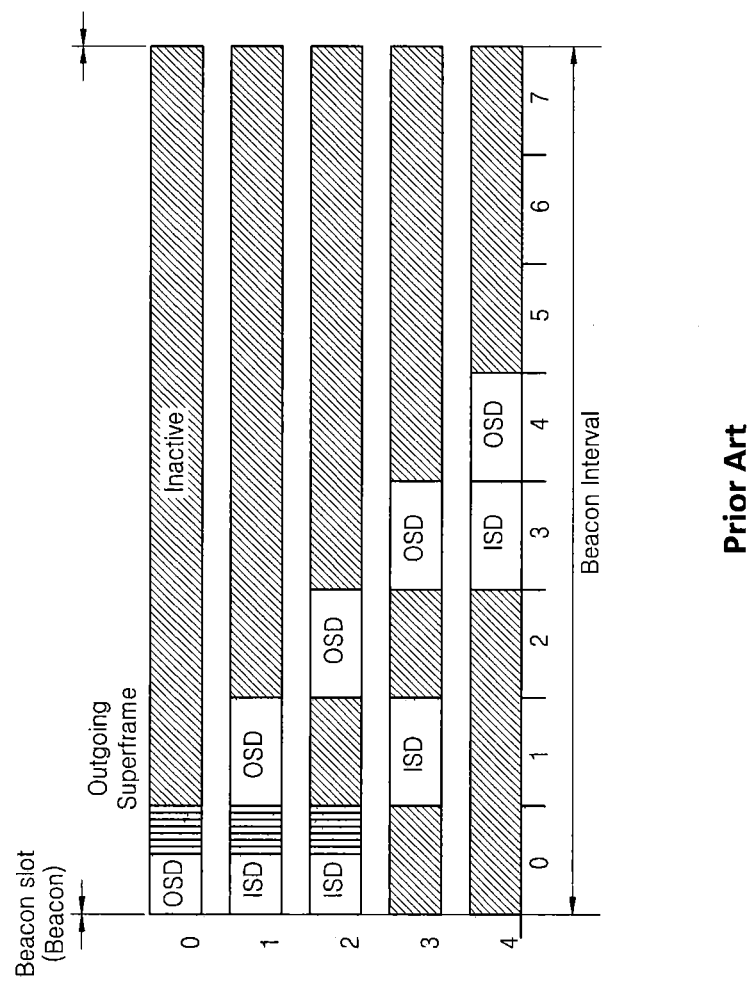
FIG. 13 is a diagram illustrating a structure of a superframe of a conventional real-time and reliable sensor network MAC system.

FIG. 13 is a diagram illustrating a structure of a superframe of a conventional real-time and reliable sensor network MAC system.

Referring to FIG. 13, each node except for a PNC has an OSD and an ISD, and a period other than the OSD and the ISD is referred to as an inactive duration in which data transmission or reception is impossible. In the ISD, a parent node can perform reception and thus can perform direct data transmission. In the OSD, it cannot be determined whether nodes which a node associates as its parent or child can perform reception, and thus an indirect transmission method is used, in which existence or non-existence of data is indicated on a beacon and a node that has received this beacon requests data transmission.

Figure 14:
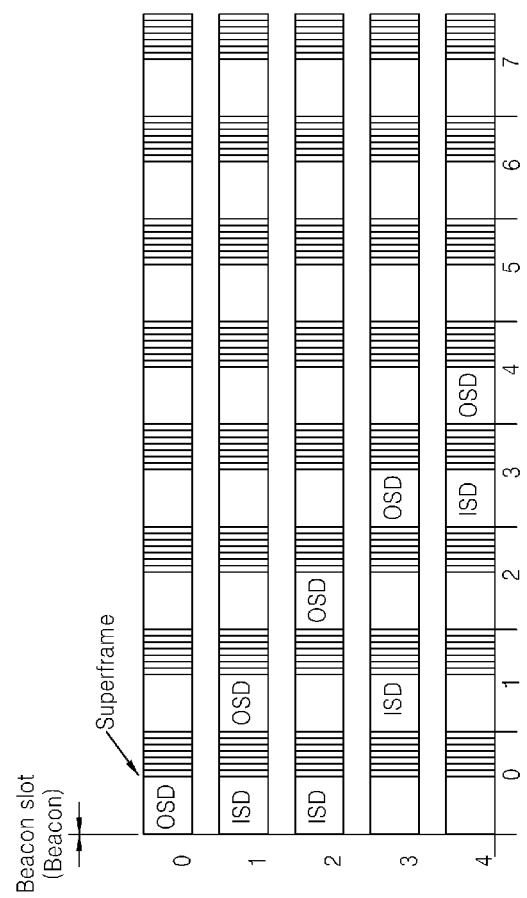
FIG. 14 is a diagram illustrating a structure of a basic superframe, according to an embodiment of the present invention.

FIG. 14 is a diagram illustrating a structure of a basic superframe, according to an embodiment of the present invention.

Referring to FIG. 14, a node to which power is supplied uses all inactive durations in a form such as an OSD in order to reduce transmission delay, whereby a GTS is extended. In this case, each node can directly transmit data to all its neighboring nodes. In an existing superframe structure, a GTS is provided to only nodes capable of directly communicating with a PNC. However, in a superframe structure according to the present invention, since a node does not rely on a PNC, an EGTS may be provided to nodes incapable of directly communicating with the PNC (nodes away from the PNC by 2 hops or more).

Figure 15:
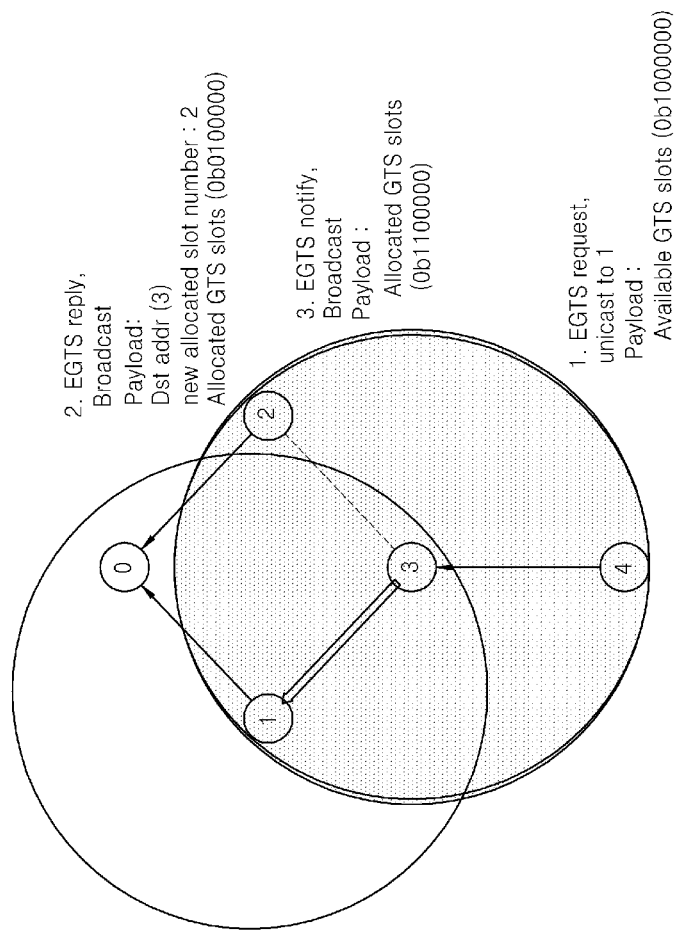
FIG. 15 illustrates allocation of a GTS of a common channel in a multi-hop environment, according to an embodiment of the present invention.

FIG. 15 illustrates allocation of a GTS of a common channel in a multi-hop environment, according to an embodiment of the present invention.

A node requesting GTS allocation, namely, node 3, transmits an EGTS request frame together with currently available GTS information (slots except for a first slot in FIG. 15) to a reception node, namely, node 1. The reception node collects the received information and its own information, selects an appropriate slot (a second slot in FIG. 15), and transmits an EGTS reply frame to its neighboring nodes and the node 3, which requested the GTS allocation, by means of broadcasting. The node 3 notifies its neighboring nodes of slot allocation information by transmitting an EGTS notify frame by broadcasting the allocated slot's number.

Figure 16:
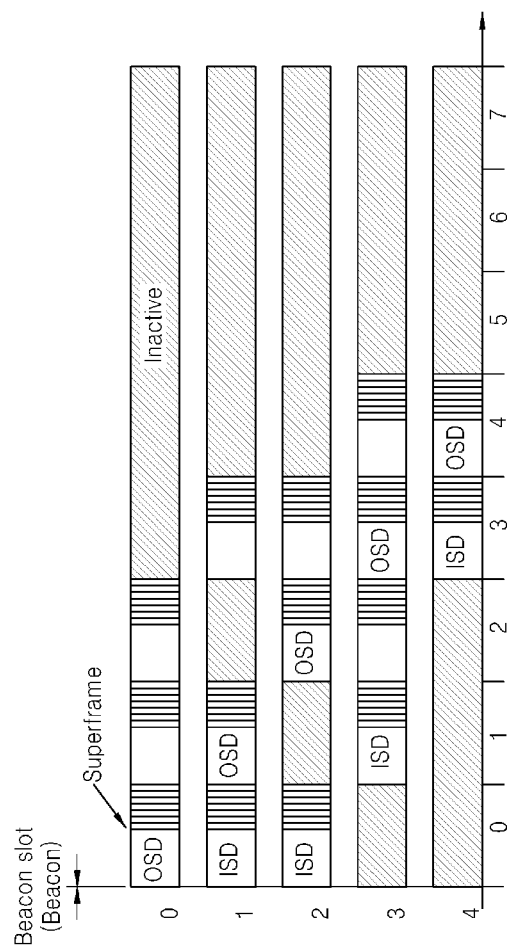
FIG. 16 is a diagram illustrating a structure of a superframe that allows only a neighboring node of an Outgoing superframe duration (OSD)-defining node to have an active duration in order to achieve low power consumption, according to an embodiment of the present invention.

FIG. 16 is a diagram illustrating a structure of a superframe that allows only a neighboring node of an OSD-defining node to have an active duration in order to achieve low power consumption, according to an embodiment of the present invention. In this case, nodes transmit data directly to all their neighboring nodes in their OSDs, and transmit data to only the OSD-defining node through beacon transmission in the other active durations. To this end, special data queue allocation, and a special option of instructing transmission conforming to an OSD of a node and a time zone of the node are added during data transmission. This transmission method may also be used to communicate with existing nodes that do not recognize a transmission method according to the present invention.

In some embodiments, instead of using a processor/controller programmed in a computer software command for executing the present invention, the present invention may use hardware corresponding to a combination of the processor and the controller. Accordingly, the present invention is not limited to a specific combination of hardware and software.

In a multihop sensor network, the present invention may contribute to significantly reducing transmission delay due to each hop waiting for an OSD. The present invention also allows real-time services to be provided to all nodes, by extending a GTS restricted to one hop in a PNC to all nodes. Furthermore, the present invention allows the number of available GTSs to be significantly increased, by using all 16 frequency band channels instead of using only a single frequency band and setting a multi-superframe. Moreover, according to the present invention, the possibility that adjacent-channel interference occurs may be determined in advance, and thus the adjacent-channel interference may be prevented from occurring. Due to a periodical change of the frequency band of a common channel, stability may improve.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A slot scheduling method performed in a medium access control (MAC) system of a multihop sensor network, the slot scheduling method comprising:
   transmitting a request command that requests slot allocation, from a source node to a destination node that exists within transmission range;
   receiving a reply command that indicates the slot allocation, from the destination node; and
   transmitting to the destination node a notification command that confirms that a slot has been allocated, and
   wherein a multi-superframe is formed of a plurality of superframes, and includes at least one non-competition period which consists of time slots including a plurality of channels, and
   wherein the allocated slot is an extended slot defined with a slot number of a time slot and a channel number indicating a channel of the time slot, and
   wherein a number of superframes constituting the multi-superframe is $2^{(MO-SO)}$, and where MO denotes a length of the multi-superframes and SO denotes a length of a superframe.

2. The slot scheduling method of claim 1, wherein in the multi-superframe, a first superframe sequentially includes a beacon period, a competition period, and a non-competition period, and superframes after the first superframe sequentially include a beacon period and a non-competition period and do not include a competition period.

3. The slot scheduling method of claim 1, wherein the request command includes an allocation bitmap table (ABT) that provides slot allocation information of a neighboring node of the source node.

4. The slot scheduling method of claim 3, wherein the request command includes a subblock that is a part of the ABT.

5. The slot scheduling method of claim 1, wherein in response to the reply command or the notification command, a node updates its own ABT on the basis of slot allocation information of the source node.

6. The slot scheduling method of claim 1, wherein the destination node has a one-hop relationship with the source node.

7. The slot scheduling method of claim 1, wherein the transmitting of the request command comprises:
transmitting a slot request primitive from a higher layer of the source node to an MAC layer management entity (MLME) of the source node; and
generating the request command that requests the slot allocation, on the basis of the slot request primitive, wherein the generating is performed by the MLME.

8. The slot scheduling method of claim 1, wherein the receiving of the reply command comprises transmitting a confirm primitive that indicates success or failure of the slot allocation, from the MLME of the source node to the higher layer of the source node in response to the reply command.

9. The slot scheduling method of claim 1, further comprising:
receiving a duplicate allocation notification command from a neighboring node that has discovered duplication of the allocated slot; and
transmitting a new slot allocation request command to the destination node.

10. A slot scheduling method performed in an MAC system of a multihop sensor network, the slot scheduling method comprising:
receiving a request command that requests slot allocation, from a source node, wherein the receiving is performed by a destination node;
transmitting a reply command that includes an allocated slot, to the source node; and
receiving from the source node a notification command that confirms the slot allocation,
wherein a multi-superframe is formed of a plurality of superframes and includes at least one non-competition period which consists of time slots including a plurality of channels, and
wherein the allocated slot is an extended slot defined with a slot number of a time slot and a channel number indicating a channel of the time slot, and
wherein a number of superframes constituting the multi-superframe is $2^{(MO-SO)}$, and
where MO denotes a length of the multi-superframes and SO denotes a length of a superframe.

11. The slot scheduling method of claim 10, wherein in the multi-superframe, a first superframe sequentially includes a beacon period, a competition period, and a non-competition period, and superframes after the first superframe sequentially include a beacon period and a non-competition period and do not include a competition period.

12. The slot scheduling method of claim 10, wherein the transmitting of the reply command comprises allocating available slots on the basis of a slot allocation bitmap table (ABT) of the source node, which is included in the request command, and a slot ABT of the destination node.

13. The slot scheduling method of claim 10, wherein the transmitting of the request command further comprises:
selecting an available slot;
determining whether interference is likely to occur in the selected available slot, on the basis of a difference between signal intensities of the source node and a neighboring node; and
re-selecting an available slot if it is determined that interference is likely to occur in the selected available slot.

14. The slot scheduling method of claim 10, further comprising:
receiving a duplicate allocation notification command from a neighboring node that has discovered duplication of the allocated slot; and
allocating a new slot to the source node.

15. A method of scheduling the slots in a non-competition period of a superframe between neighboring nodes in a MAC system of a multihop sensor network, the slot scheduling method comprising:
defining a multi-superframe by including at least one superframe, wherein the defining is performed by a coordinator of the multihop sensor network;
constructing a non-competition period of the multi-superframe with an extended slot defined with a channel number and a slot number;
transmitting one of a request command, reply command, or notification command that comprises an extended slot characteristic field, and
wherein the multi-superframe is formed of a plurality of superframes and includes at least one non-competition period which consists of time slots including a plurality of channels, and
wherein the slot number includes a time slot and a channel number indicates a channel of the time slot, and
wherein a number of superframes constituting the multi-superframe is $2^{(MO-SO)}$, and
where MO denotes a length of the multi-superframes and SO denotes a length of a superframe.

16. The slot scheduling method of claim 15, wherein the extended slot comprises at least one subblock.

17. The slot scheduling method of claim 15, wherein the superframe sequentially includes a beacon period in which a node transmits a beacon through a common channel, a competition period in which nodes competitively transmit data through the common channel, and a non-competition period in which data is transmitted in an extended slot corresponding to the slot number through a channel corresponding to the channel number.

18. The slot scheduling method of claim 15, wherein in the multi-superframe, superframes after a first superframe sequentially include a beacon period and a non-competition period and do not include a competition period.

19. The slot scheduling method of claim 15, wherein a frequency band of the common channel is hopped according to a determined pattern.

20. A method of scheduling the slots in a non-competition period of a superframe between neighboring nodes in a MAC system of a multihop sensor network, the slot scheduling method comprising:

transmitting a request command for the slot scheduling, from a first node to a second node;

receiving a reply command from the second node; and transmitting to the second node a notification command that confirms the reply command, and wherein a multi-superframe is formed of a plurality of superframes, and includes at least one non-competition period which consists of time slots including a plurality of channels, and wherein an allocated slot is an extended slot defined with a channel number indicating a channel of a time slot and a slot number of the time slot, and wherein a number of superframes constituting the multi-superframe is $2^{(MO-SO)}$, and where MO denotes a length of the multi-superframes and SO denotes a length of a superframe.

21. The slot scheduling method of claim 20, wherein the request command comprises one of the group consisting of allocation, deallocation, reallocation, duplicate allocation notification, and allocation change of the extended slot.

22. The slot scheduling method of claim 20, wherein each of the request command, the reply command, and the notification command comprises extended slot allocation information of the neighboring nodes in the form of a bitmap.

23. The slot scheduling method of claim 20, wherein the extended slot characteristic field comprises:
- a subfield representing the number of requested extended slots;
- a subfield representing a scheduling type that comprises allocation, deallocation, reallocation, duplicate allocation notification, suspension, reduction, or restart of the extended slot;
- a subfield representing a command type that comprises a request, a reply, or a notification;
- a subfield representing a channel number and a start slot number of the extended slot that is scheduled;
- a subfield representing a subblock of an ABT the provides extended slot allocation information of a neighboring node of the first node;
- a subfield representing a start of the subblock of the ABT; and
- a subfield representing the length of the subblock of the ABT.

* * * * *

UNITED STATES PATENT AND TRADEMARK OFFICE
CERTIFICATE OF CORRECTION

PATENT NO. : 8,724,557 B2  
APPLICATION NO. : 12/501024  
DATED : May 13, 2014  
INVENTOR(S) : Chang Sub Shin et al.

Page 1 of 1

It is certified that error appears in the above-identified patent and that said Letters Patent is hereby corrected as shown below:

On the title page

In Item (73), the Assignee(s) should be listed as --Electronics and Telecommunications Research Institute, Daejeon (KR) AND Research Foundation of the City University of New York, New York (NY)--.

Signed and Sealed this  
Seventh Day of July, 2015

Michelle K. Lee  
*Director of the United States Patent and Trademark Office*